(12) United States Patent
Shim et al.

(10) Patent No.: US 8,021,071 B2
(45) Date of Patent: Sep. 20, 2011

(54) COMPLIANT JOINT

(75) Inventors: Young Bo Shim, Seoul (KR); Ja Woo Lee, Seoul (KR); Youn Baek Lee, Suwon-si (KR); Jeong Hun Kim, Suwon-si (KR); Kyung Shik Roh, Seongnam-si (KR); Hyun Kyu Kim, Seoul (KR); Hyun Seok Yang, Seoul (KR); Dong Jun Hyun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 286 days.

(21) Appl. No.: 12/110,817

(22) Filed: Apr. 28, 2008

(65) Prior Publication Data

US 2009/0092442 A1    Apr. 9, 2009

(30) Foreign Application Priority Data

Oct. 5, 2007    (KR) ............ 10-2007-0100138

(51) Int. Cl.
*F16D 7/00*    (2006.01)
(52) U.S. Cl. ............... 403/328; 464/34; 464/160
(58) Field of Classification Search ............... 403/113, 403/322.2, 326, 327, 328, 352, 359.1, 359.4; 464/34, 37; 74/490.05; 901/49
See application file for complete search history.

(56) References Cited

U.S. PATENT DOCUMENTS

| | | | | |
|---|---|---|---|---|
| 924,749 A * | 6/1909 | Drapier | ............ | 464/37 |
| 1,443,026 A * | 1/1923 | Lee | ............ | 464/37 |
| 2,171,829 A * | 9/1939 | Haupt | ............ | 192/105 C |
| 3,203,524 A * | 8/1965 | Orwin | ............ | 192/56.5 |
| 3,762,183 A * | 10/1973 | Bolliger | ............ | 464/37 |
| 4,653,623 A * | 3/1987 | Demorest | ............ | 464/37 |
| 5,342,241 A * | 8/1994 | Kampf | ............ | 464/37 |
| 5,924,536 A * | 7/1999 | Frenken | ............ | 464/37 |
| 6,012,985 A * | 1/2000 | Sukup | ............ | 464/37 |
| 6,666,283 B2 * | 12/2003 | Frauhammer et al. | ............ | 464/37 |

FOREIGN PATENT DOCUMENTS

| | | |
|---|---|---|
| JP | 14-007673 | 5/1939 |
| JP | 48-44523 | 12/1973 |
| JP | 64-2884 | 1/1989 |
| JP | 2-125214 | 10/1990 |

(Continued)

OTHER PUBLICATIONS

Japanese Office Action dated Jul. 13, 2010.

(Continued)

*Primary Examiner* — Michael P Ferguson
(74) *Attorney, Agent, or Firm* — Staas & Halsey LLP (57) ABSTRACT

A compliant joint capable of achieving passive compliance for a robot in order to prevent an injury to a human by collision with the robot. The compliant joint includes a housing, a cam member rotatably mounted in the housing, a roller spring device mounted to the cam member to be compressed and extended, a guiding member formed in the housing to guide compression and extension of the roller spring device in accordance with rotation of the cam member, and a receiving recess formed at the guiding member to engage the housing and the cam member with each other by receiving the roller spring device and release the engagement by separating from the roller spring device. Accordingly, robustness of the robot can be maintained when an impact less than a predetermined magnitude is applied, while being suddenly decreased when an impact greater than the magnitude is applied.

8 Claims, 9 Drawing Sheets

FOREIGN PATENT DOCUMENTS

| | | |
|---|---|---|
| JP | 4-226886 | 8/1992 |
| JP | 7-19256 | 1/1995 |
| JP | 2004-270854 | 9/2004 |
| JP | 2007-190656 | 8/2007 |
| KR | 10-0484885 | 4/2004 |

OTHER PUBLICATIONS

Japanese Office Action issued Oct. 21, 2010 in corresponding Japanese Patent Application 2008-144929.

* cited by examiner

COMPLIANT JOINT

CROSS-REFERENCE TO RELATED APPLICATIONS

This application claims the benefit of Korean Patent Application No. 2007-100138, filed on Oct. 5, 2007, in the Korean Intellectual Property Office, the disclosure of which is incorporated herein by reference.

BACKGROUND

1. Field

The present invention relates to a compliant joint, and more particularly to a compliant joint used for a robot to prevent an injury to a human by collision with the robot.

2. Description of the Related Art

Generally, an industrial robot is widely used in various fields, for example, a production line, since it is capable of performing an assigned work accurately without a manual operation and supervision by a human. For instance, a robot used in an automobile industry performs a variety of work such as carrying and welding of an automobile body.

On the contrary, an intelligent service robot works interactively in an active space of humans. For instance, a robot cleaner detects a pollution level of a predetermined interior space and performs cleaning, thereby providing a necessary service for humans. However, such an intelligent service robot may collide with an obstacle unexpectedly during the work. In other words, the intelligent service robot bears a risk of accidental collision with a human. Therefore, for a harmonious interaction between the robot and the human, safety for humans has become an essential factor in designing the intelligent service robot.

The intelligent service robot will be referred to briefly as a 'robot' hereinafter. The robot has been designed to be flexible so as not to injure a human by collision. Such a technical solution is called 'robot compliance.' An active or a passive method can be used to endow the robot with the compliance. According to the active method, a controller detects a feedback signal of a force/torque sensor mounted to the robot and accordingly copes with a force or an impact applied from the outside. According to the passive method, mechanical elements such as springs and dampers are used to achieve the necessary safety.

The active method is limited in achieving the safety since controlling is performed in accordance with a feedback signal of a sensor. When using a vision sensor, for example, the vision sensor having low resolution is insufficient to promptly cope with a sudden external impact. Furthermore, if the signal of the sensor includes noise or if the external impact has an uncontrollable bandwidth, the active method is not effective.

However, the passive method using mechanical elements to absorb the external impact, rather than a special sensor, is capable of reacting to the impact instantly, with a low malfunction rate. Thus, development of a mechanism that maintains the safety of the human and the robot is required. In other words, the robot system needs to be designed and manufactured as intrinsically safe by achieving passive compliance.

SUMMARY

The present invention has been made in order to solve the above problems. It is an aspect of the invention to provide a compliant joint capable of achieving passive compliance of a robot in order to prevent an injury to a human by collision with the robot.

Additional aspects and/or advantages of the invention will be set forth in part in the description which follows and, in part, will be apparent from the description, or may be learned by practice of the invention.

Consistent with one aspect, an exemplary embodiment of the present invention provides a compliant joint including a housing, a cam member rotatably mounted in the housing, a roller spring device mounted to the cam member to be compressed and extended, a guiding member formed in the housing to guide compression and extension of the roller spring device in accordance with rotation of the cam member, and a receiving recess formed at the guiding member to engage the housing and the cam member with each other by receiving the roller spring device and release the engagement by separating from the roller spring device.

The guiding member may have an oval form to compress the roller spring device, separated from the receiving recess, more and more as the cam member rotates, thereby increasing an elastic restoring force of the roller spring device.

The receiving recess may include slant surfaces so that a torque transmitted to the cam member generates a force in a direction for compressing the roller spring device received in the receiving recess.

The roller spring device may include a roller member facing the guiding member, and a spring member connected with the roller member so that the roller member is moved in accordance with compression and extension of the spring member.

The roller member may include a roller contacting the guiding member, a roller body supporting the roller, and a piston connected to the roller body to support one end of the spring member.

The cam member may include a mounting hole which guides a reciprocating motion of the piston therethrough.

The cam member may include a preloading device capable of compressing and extending the roller spring device.

The preloading device may include a sill supporting an end of the roller spring device, and an adjuster screw-connected with the cam member and rotated to reciprocate the sill.

According to another embodiment, there is provided a compliant joint including a housing, a cam member rotatably mounted in the housing, a guiding member formed in the housing to enclose the cam member, a receiving recess formed on the guiding member, and a roller spring device mounted to the cam member to engage the housing with the cam member by being received in the receiving recess and release the engagement by escaping from the receiving recess.

The compliant joint may further include stoppers protruded on the guiding member at a predetermined distance from the receiving recess to restrict rotation of the roller spring device when the roller spring device is separated from the receiving recess.

The guiding member may have an oval form so that a radial distance from a center of rotation of the cam member to the guiding member gradually decreases as the roller spring device rotates from the receiving recess to the stopper.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE EMBODIMENTS

Reference will now be made in detail to exemplary embodiments of the present invention, examples of which are illustrated in the accompanying drawings, wherein like reference numerals refer to like elements throughout. The embodiments are described below to explain the present invention by referring to the figures.

In controlling a robot, generally, it is preferred that the robot has a great robustness so that a position of the robot can be controlled more accurately. However, preparing for collision with a human, the robot preferably has a minor robustness such that safety for the human can be secured. Accordingly, a compliant joint is applied to a hinge part of the robot, such as a robot arm, so as to reduce robustness of the robot upon a relatively great external impact that may injure the human and increase the robustness upon a minor external impact, so that positions of the robot can be controlled accurately. Hereinafter, the compliant joint applying a mechanism including a roller spring device and a guiding member will be described.

Figure 1:
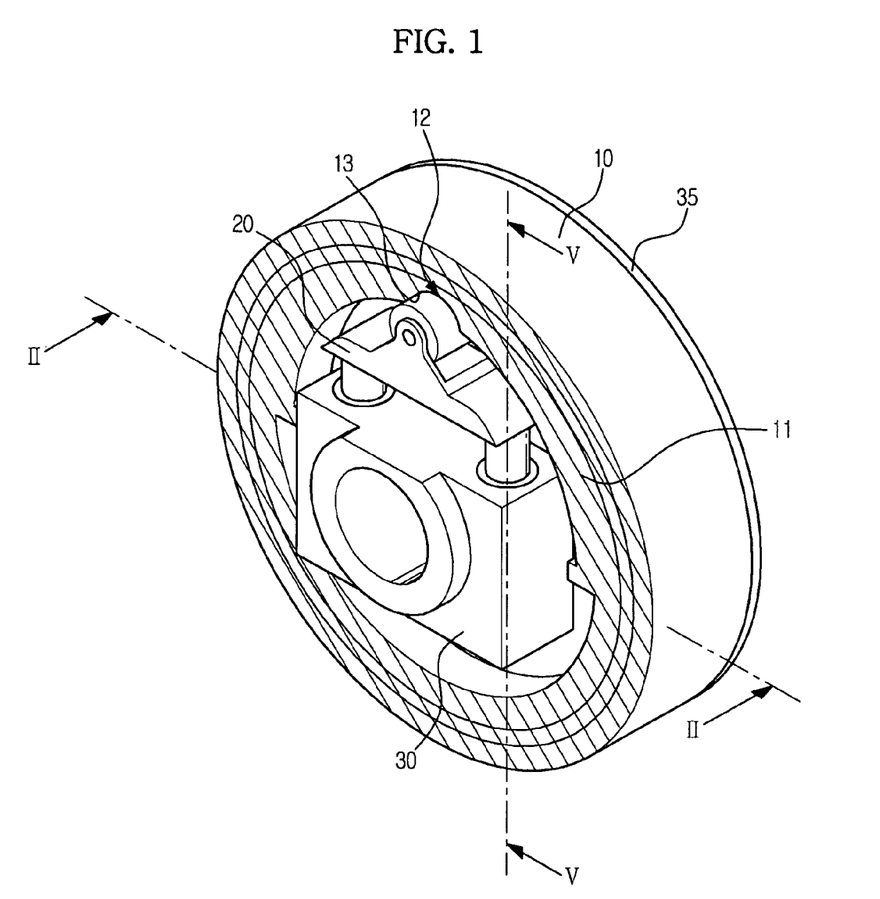
FIG. 1 is a perspective view of a compliant joint according to an embodiment of the present invention, showing main parts of the compliant joint.

FIG. 1 is a perspective view of a compliant joint according to an embodiment of the present invention, showing main parts of the compliant joint.

Figure 2:
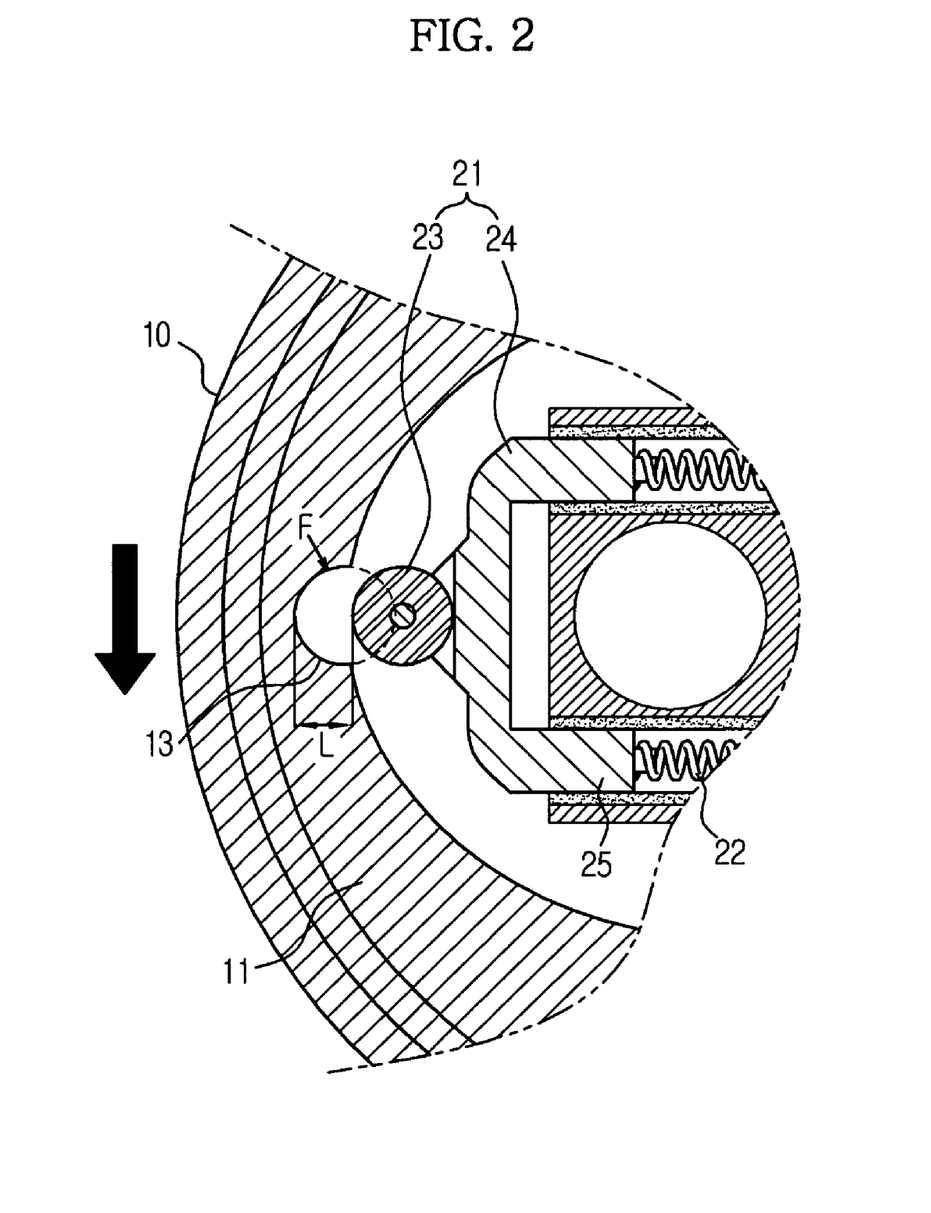
FIG. 2 is a sectional view showing the main parts of the compliant joint according to the embodiment of the present invention.

FIG. 2 is a sectional view showing the main parts of the compliant joint according to the embodiment of the present invention.

Referring to FIGS. 1 and 2, the compliant joint according to an embodiment of the present invention, to achieve passive compliance, includes a housing 10, and a cam member 30 rotatably connected in the housing 10. The housing 10 includes a guiding member 11 while the cam member 30 includes a roller spring device 20. The guiding member 11 and the roller spring device 20 engage and disengage the housing 10 and the cam member 30 with each other. When a minor external impact is applied, engagement between the housing 10 and the cam member 30 is maintained so that the housing 10 and the cam member 30 operate together. When a great external impact is applied, the engagement is released so that the housing 10 and the cam member 30 operate separately.

The guiding member 11 has a substantially circular form and includes a receiving recess 12 of a predetermined depth. Slant surfaces 13 are formed at both sides of the receiving recess 12, being inclined by less than 90 degrees. Because the center of rotation of a roller 23 is within the receiving recess 12, when an inclination of the slant surfaces 13 is less than 90 degrees, the slant surfaces 13 facing the roller spring device 20 are able to generate a compressive force that compresses the roller spring device. However, if the center of rotation of the roller 23 is out of the receiving recess 12, the slant surfaces 13 are able to generate the compressive force although inclined by greater than 90 degrees. Although the slant surfaces 13 of this embodiment have inclinations less than 90 degrees, the present invention is not limited to this structure.

The roller spring device 20 includes a roller member 21 and a spring member 22. The roller member 21 faces the guiding member 11. The spring member 22 is in a compressed position as supported by the cam member 30, thereby retaining an elastic restoring force. The roller member 21 is kept in close contact with the receiving recess 12 of the guiding member 11 by the elastic restoring force of the spring member 22. Especially when the roller member 21 is received in the receiving recess 12 of the guiding member 11, the engagement between the housing 10 and the cam member 30 is maintained. On the other hand, when the roller member 21 escapes from the receiving recess 12, the engagement is released.

In an initial state where the housing 10 and the cam member 30 are engaged, maintenance of the engagement upon application of an external impact greater than a predetermined magnitude is determined by a connection state between the roller member 21 and the receiving recess 12. In order for escape of the roller member 21 from the receiving recess 12, the spring member 22 needs to be compressed by a predetermined length L. In other words, the engagement is maintained when the spring member 22 is compressed by less than the predetermined length L, and released when greater.

Factors influencing compression of the spring member 22 when an impact of the predetermined magnitude occurs will be described. Referring to FIG. 2, since the housing 10 and the cam member 30 are engaged to be rotatable with each other, when the impact is applied, a torque T operates on the housing 10 or the cam member 30. The torque T transmits a force F to the roller member 21 through the slant surfaces 13 formed in the receiving recess 12. A direction of the force F transmitted to the roller member 21 is deflective from an axial direction of the spring member 22. Therefore, only a component of the force F coaxial with the spring member 22 operates in a direction for compressing the spring member 22. That is, compression of the spring member 22 is related to the inclination of the slant surfaces 13 formed in the receiving recess 12.

Furthermore, the spring member 22 mounted as compressed in the initial state retains the elastic restoring force pushing the roller member 21 into close contact with the guiding member 11. When a spring constant of the spring member 22 is fixed, the more the spring member 22 is compressed, the greater elastic force pushes the roller member 21 toward the guiding member 11. Therefore, for disengagement between the housing 10 and the cam member 30, the force F transmitted to the roller member 21 by the impact torque T needs to be greater than the elastic force that pushes the roller member 21 to the guiding member 11. Thus, a compression degree of the spring member 22 required for the disengagement is related to an initial compression degree of the spring member 22. In the embodiment of the present invention, accordingly, a preloading device 50 is provided to control the initial compression degree of the spring member 22. The preloading device 50 will be explained in detail hereinafter.

As aforementioned, the magnitude of the impact determining the engagement and disengagement between the housing 10 and the cam member 30 can be controlled by adjusting the inclination of the slant surfaces 13 of the receiving recess 12 of the guiding member 11 and the initial compression degree of the spring member 22. Hence, the passive compliance, which is broadly applicable, can be achieved. For reference, it is preferred that the inclination of the slant surfaces 13 is determined during design of the product and the compression degree of the spring member 22 is adjusted using the preloading device 50 during use of the product.

Figure 3:
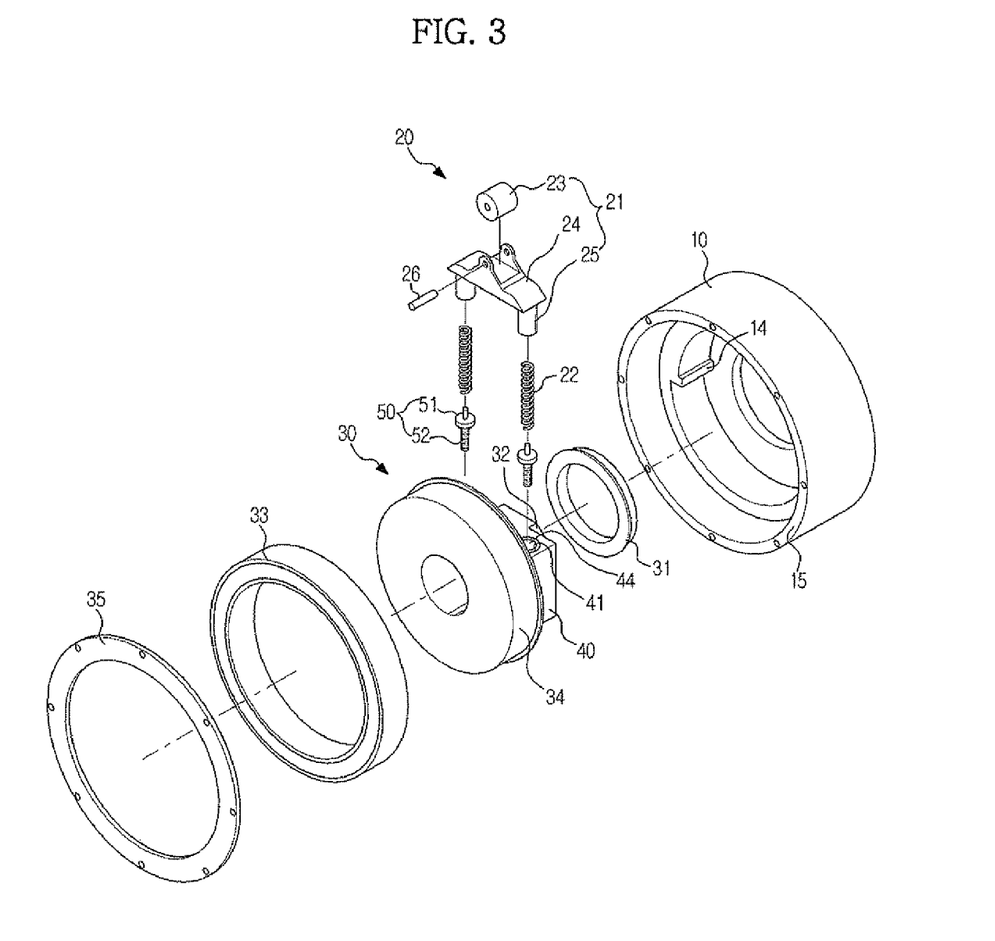
FIG. 3 is an exploded perspective view schematically showing the structure of the compliant joint according to the embodiment of the present invention.

FIG. 3 is an exploded perspective view of the compliant joint according to the embodiment of the present invention.

As shown in FIG. 3, the compliant joint includes a housing 10 constituting the exterior appearance. The housing 10 has a cylindrical form. A left side of the housing 10, with respect to the drawing, is completely open so that internal component parts including the cam member 30 and first and second bearings 31 and 33 are mounted in the housing 10. The cam member 30 is rotatably mounted in the housing 10. More particularly, a mounting member 40 is formed in the center of the cam member 30 for mounting of the roller spring device 20. A first bearing supporting part 32 for connection with the first bearing 31 is protruded on a right side of the mounting member 40, and a second bearing supporting part 34 for the second bearing 33 is protruded on a left side. The first bearing 31 is supported by the cam member 30 and a right side of the housing 10. The second bearing 33 is supported by the cam member 30 and a bearing supporting member 35 having an annular form. The bearing supporting member 35 is connected with a left sectional surface 15 of the housing 10.

Figure 5:
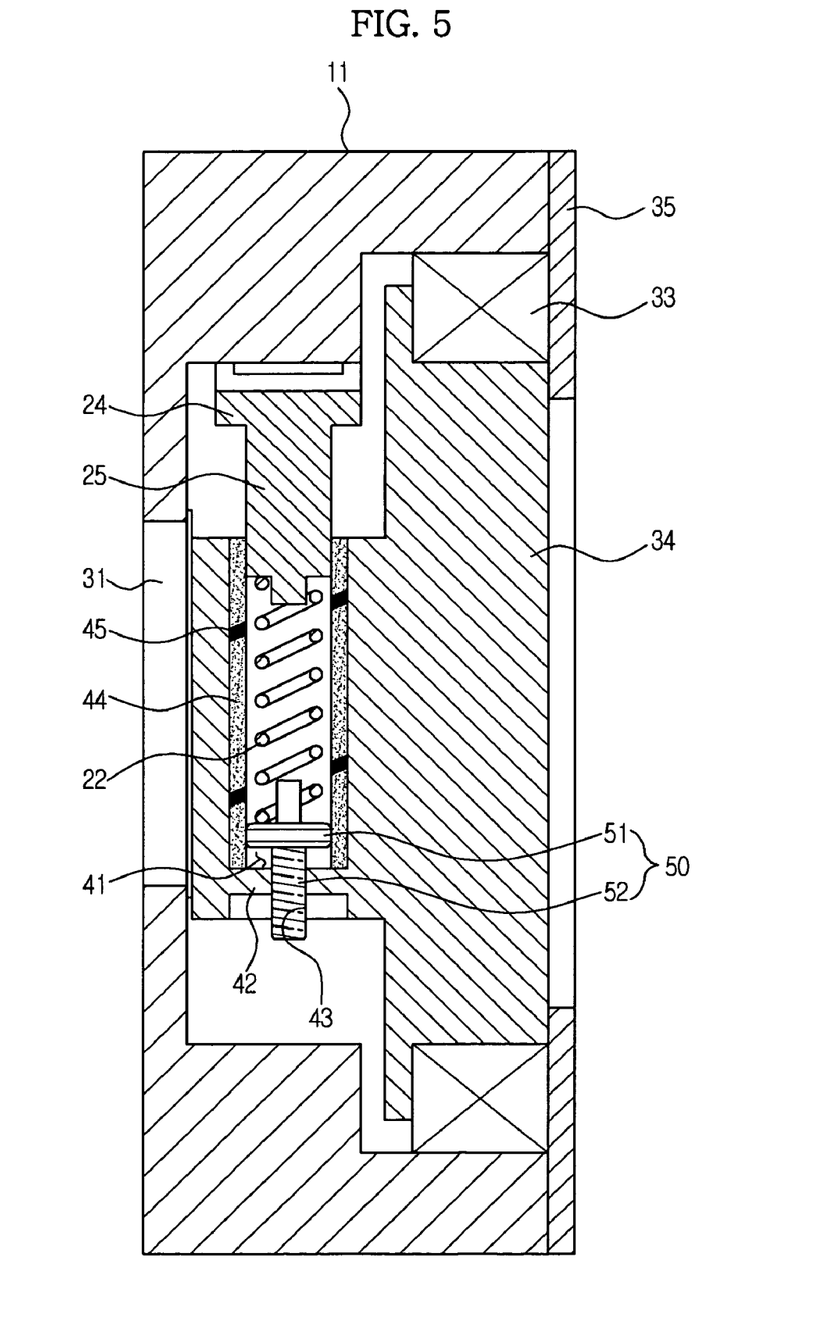
FIG. 5 is a sectional view of a mounting member of a cam member of the compliant joint according to the embodiment of the present invention.

FIG. 5 is a sectional view of the mounting member 40 of the cam member 30 according to the embodiment of the present invention.

As shown in FIG. 5, a mounting hole 41 is formed vertically, penetrating the mounting member 40 of the cam member 30. A supporting part 42 that supports the preloading device 50 is formed at the mounting hole 41, more specifically, protruded from an inner circumference of the mounting hole 41. A penetration hole 43 is formed through the center of the supporting part 42, having a screw thread along an inner circumference thereof. A bushing 44 is inserted in the mounting hole 41 so that the roller spring device 20 can smoothly move. The bushing 44 contains a graphite 45 to lubricate the movement of the roller spring device 20.

The preloading device 50 controls the initial compression degree of the spring member 22. The preloading device 50 includes a sill 51 supporting an end of the spring member 22 and an adjuster 52 having a screw thread. The adjuster 52 is inserted in the penetration hole 43 of the cam member 30. Since the adjuster 52 and the penetration hole 43 both have the screw threads correspondingly, the sill 51 can be reciprocated within the mounting hole 41 according to rotation of the adjuster 52 in clockwise and counterclockwise directions. As a result, the spring member 22 supported by the sill 51 can be compressed and extended. Here, a predetermined space formed around the adjustor 52 at a lower part of the mounting hole 41 enables the clockwise and counterclockwise rotation of the adjustor 52.

Referring to FIG. 3, the roller spring device 20 includes the roller member 21 and the spring member 22. The roller member 21 includes the roller 23 moving along an inner circumference of the guiding member 11, a roller body 24 supporting the roller 23 with a pin 26, and a piston 25 integrally formed with the roller body 24 to support the spring member 22. As shown in FIG. 5, the piston 25 reciprocates, being inserted in the bushing 44 inserted in the mounting hole 41.

Figure 4:
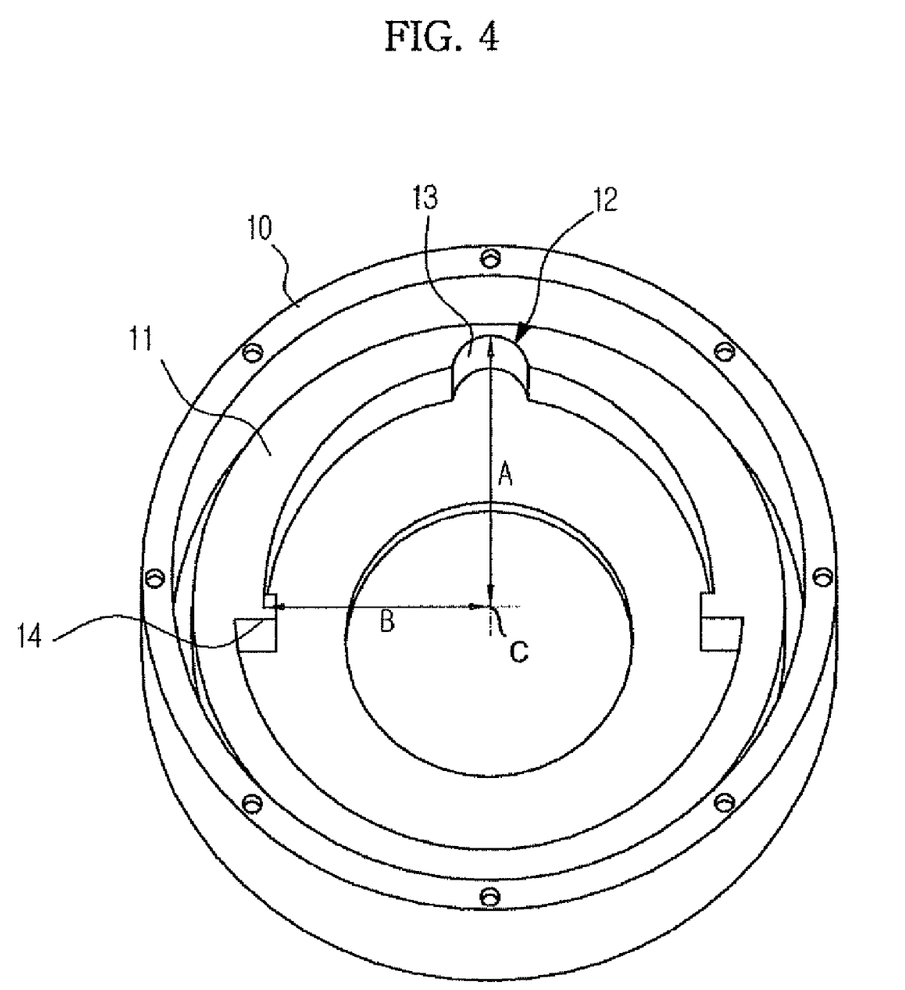
FIG. 4 is a perspective view showing an inside of a housing of the compliant joint according to the embodiment of the present invention.

FIG. 4 is a perspective view showing the inside of the housing 10 according to the embodiment of the present invention.

Referring to FIG. 4, the guiding member 11 having a substantially circular form is protruded inside the housing 10. As aforementioned, the guiding member 11 includes the receiving recess 12 that receives the roller 23. Stoppers 14 are symmetrically arranged along the inner circumference of the guiding member 11 at a predetermined distance from the receiving recess 12. The stoppers 14 are protruded toward the center from the inner circumference. When the impact greater than the predetermined magnitude is applied, the stoppers 14 restrain the roller 23 from rotating along the inner circumference of the guiding member 11, thereby restricting rotation of the cam member 30.

When the applied impact is removed, the housing 10 and the cam member 30 are required to return to the initial state. For example, after a robot arm, achieved with the passive compliance, is bent by the external impact, the robot arm needs to return to its initial position. Accordingly, the guiding member 11 is configured to return to the initial state automatically after the external impact is removed.

The cam member 30 is mounted with the roller spring device 20 to rotate together. The roller spring device 20 faces the guiding member 11. Therefore, the cam member 30 is rotated along the inner circumference of the guiding member 11. More specifically, when the impact greater than the predetermined magnitude is applied, the cam member 30 rotates together with the receiving recess 12 and the stoppers 14 along the inner circumference of the guiding member 11. It is assumed that a radius A denotes a radial distance from the center of rotation C of the cam member 30 to the receiving recess 12, and a radius B from the center of rotation C to the stopper 14. The radius B is set to be shorter than the radius A. A radial distance from the center of rotation C to the guiding member 11 between the receiving recess 12 and the stopper 14 gradually decreases from the receiving recess 12 toward the stopper 14. With this structure, when the cam member 30 rotates from the receiving recess 12 toward the stopper 14, the roller spring device 20 is gradually compressed. Therefore, the elastic restoring force of the roller spring device 20 is increased, thereby returning the cam member 30 back to the initial state.

Hereinafter, the operation of the compliant joint according to the embodiment of the present invention will be described in greater detail.

Figure 6:
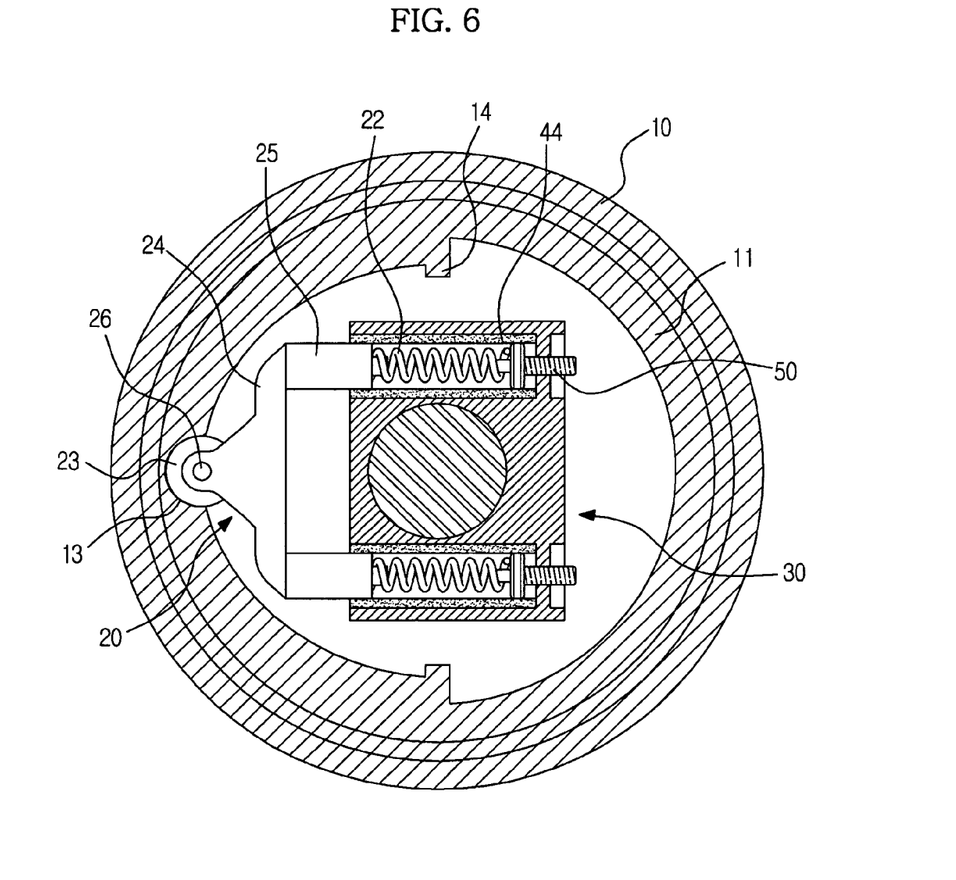
FIG. 6 is a sectional view showing an initial state of the compliant joint according to the embodiment of the present invention.

FIG. 6 is a sectional view showing an initial state of the compliant joint according to the embodiment of the present invention.

As shown in FIG. 6, the roller 23 of the roller spring device 20 is received in the receiving recess 12 of the guiding member 11. Since being thus engaged with each other, the housing 10 and the cam member 30 are operated together. When an external impact less than the predetermined magnitude M is transmitted to the robot, the robot is robust enough to cope with the impact and therefore, the position of the robot can be controlled accurately.

Figure 7:
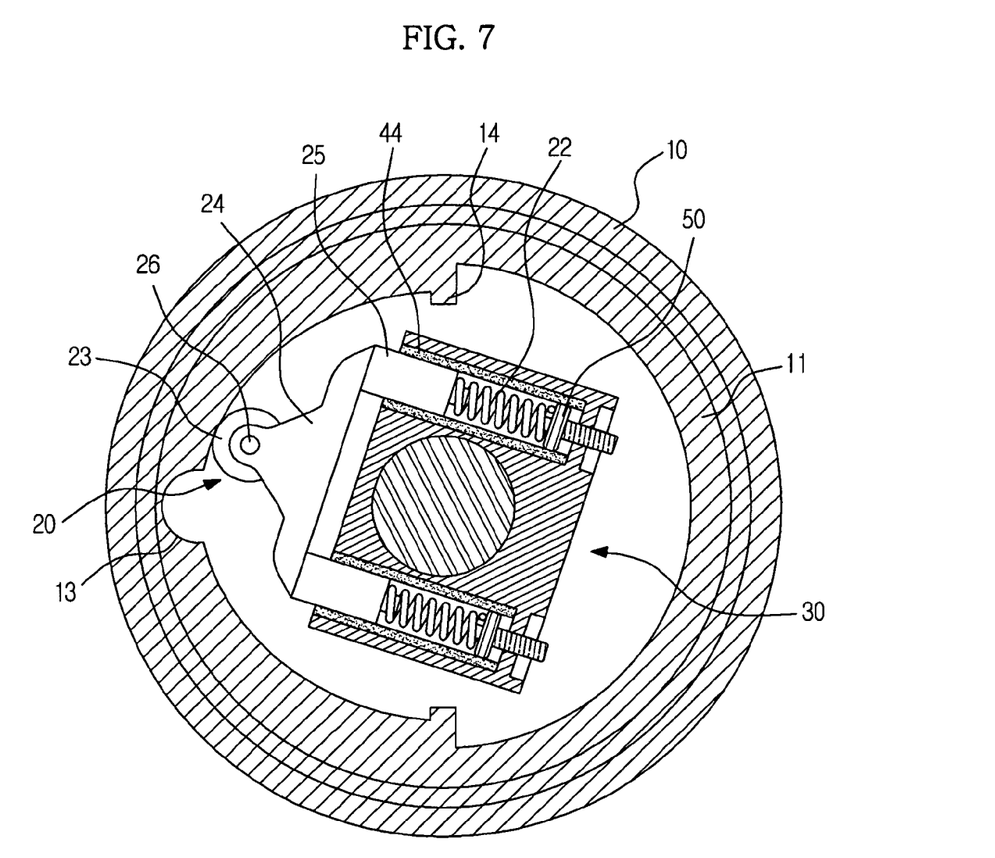
FIG. 7 is a sectional view showing the compliant joint in operation.

FIG. 7 is a sectional view showing the compliant joint in operation.

As shown in FIG. 7, when the impact greater than the predetermined magnitude is applied, the torque T is transmitted to the housing 10 or the cam member 30. The spring member 22 of the roller spring device 20 is compressed, so that the roller 23 escapes from the receiving recess 12. Therefore, the housing 10 and the cam member 30 are disengaged from each other and operated separately. As a consequence, when a significant impact that may injure a human is applied, the compliant joint mounted at a hinge part of the robot interrupts transmission of the impact greater than the predetermined magnitude M to the human. Hence, the intrinsically safe robot capable of interacting harmoniously with humans can be achieved.

Figure 8:
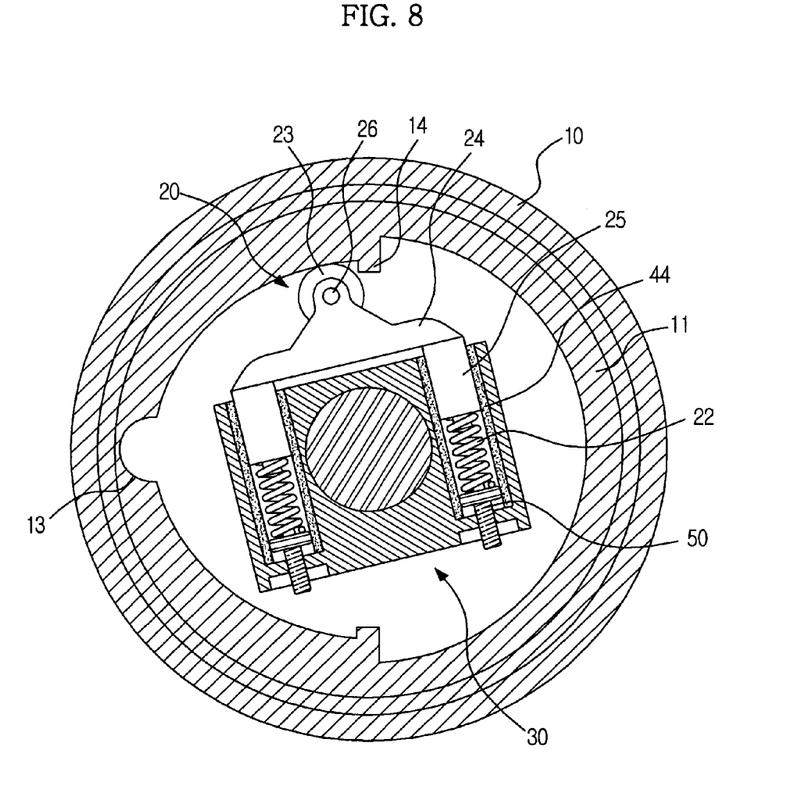
FIG. 8 is a sectional view showing a state where rotation of the housing and the cam member is restricted.

FIG. 8 is a sectional view showing a state where rotation of the housing and the cam member is restricted.

With reference to FIG. 8, the roller 23 separated from the receiving recess 12 and rotated along the inner circumference of the guiding member 11 is stopped by the stopper 14, thereby restricting rotation of the cam member 30 with respect to the housing 10. Therefore, parts of the robot such as the robot arm connected with the cam member 30 cannot move.

Figure 9:
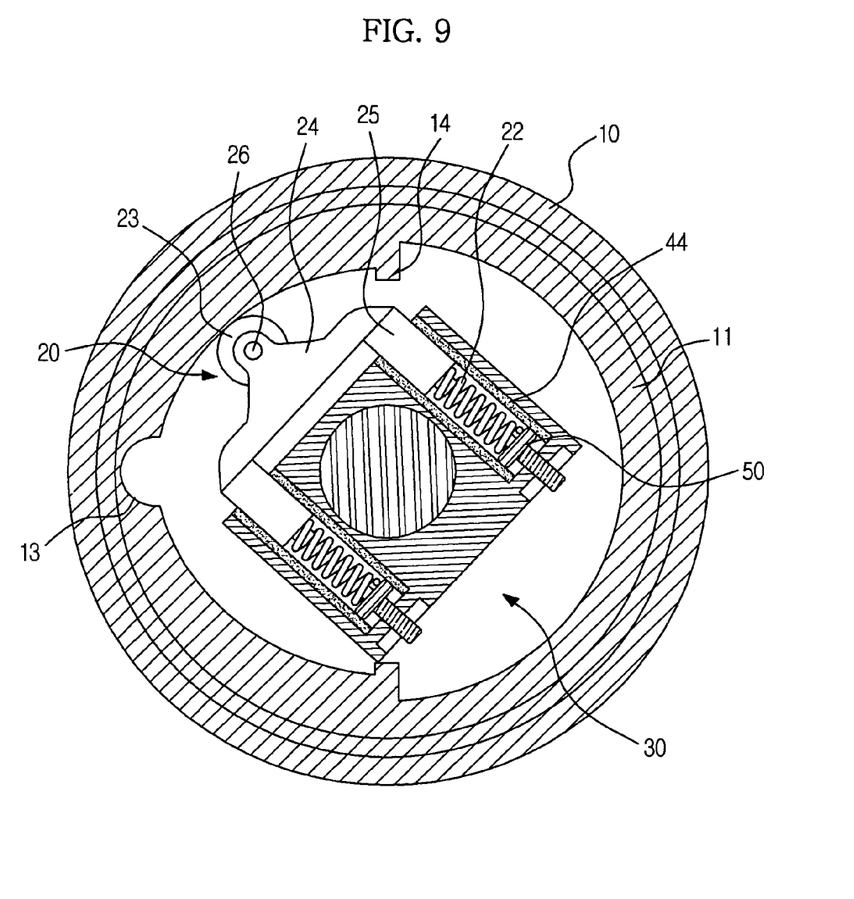
FIG. 9 is a sectional view of the housing and the cam member returned to the initial state.

FIG. 9 is a sectional view of the housing and the cam member returned to the initial state.

Referring to FIG. 91 the radial distance from the center of rotation C of the cam member 30 to the guiding member 11 gradually decreases as going from the receiving recess 12 toward the guiding member 11. Therefore, as shown in FIG. 8, when the roller 23 is stopped by the stopper 141 the spring member 22 is compressed most and thereby retains the greatest restoring force. On the contrary, when the roller 23 is received in the receiving recess 12, the spring member 22 retains the smallest restoring force. In other words, owing to an oval form of the guiding member 11 the restoring force of the roller spring device 20 is varied in accordance with a rotational angle of the cam member 30. Consequently, the cam member 30 is able to automatically return to the initial state.

As can be appreciated from the above description, the compliant joint according to the present invention enables an accurate position controlling of a robot by maintaining robustness of the robot when an impact less than a predetermined magnitude is applied, consequently improving the work efficiency of the robot.

Meanwhile, upon application of an impact greater than the predetermined magnitude, the compliant joint reacts to suddenly decrease the robustness of the robot, thereby guaranteeing safety. As a result, an unexpected injury to a human by the robot can be prevented.

The compliant joint according to the present invention, since being passively operated, has an excellent reaction speed and almost no risk of malfunction. That is, reliability of the robot can highly be improved.

In addition, the compliant joint according to the present invention can be applied to public service robots, supporting robots for the disabled and the elderly, domestic robots, assistant robots for workers in a cell-type production line and human-interactive robots in a production line, as well as humanoid robots, so as to guarantee the safety for humans.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A compliant joint comprising:
a housing having an inner annular wall;
a cam member rotatably mounted in the housing to non-rotatably drive the housing and to rotate about a rotation axis within the housing when a torque which exceeds a predetermined value is applied to one of the housing and the cam member, the cam member including a radially extending mounting hole;
a roller spring device mounted to the cam member to be compressed and extended, the roller spring device including a roller body supporting a roller and a spring member connected to the roller body mounted in the mounting hole to bias the roller radially outward so that the roller is moved in accordance with compression and extension of the spring member; and
a substantially circular guiding member defined by the inner annular wall of the housing to guide compression and extension of the roller spring device in accordance with rotation of the cam member,
wherein the guiding member includes
a receiving recess having a slant surface formed at each opposing side of the receiving recess formed within the guiding member to non-rotatably engage the housing and the cam member with each other by receiving the roller of the roller spring device such that the spring is in a radially extended position, and to release the engagement by separating from the roller of the roller spring device from the receiving recess such that the spring is in a radially compressed position, wherein when a torque which exceeds a predetermined value is applied to one of the housing and the cam member, the torque transmits a force to the roller through the slant surfaces formed in the receiving recess to radially compress the spring member and release engagement of the roller from the receiving recess so that the roller rotates along the annular wall and the cam member rotates relative to the housing in one of the directions of clockwise and counter clockwise, and
an inner circumference of the guiding member is symmetrically formed with respect to the receiving recess, and
a pair of stoppers, each stopper protruded from the inner circumference of the guiding member at a predetermined distance from a respective one of the opposing sides of the receiving recess to restrict rotation of the roller spring device when the roller spring device is separated from the receiving recess.

2. The compliant joint according to claim 1, wherein the guiding member has an oval form to compress the roller spring device, separated from the receiving recess, more and more as the cam member rotates relative to the housing, thereby increasing an elastic restoring force of the roller spring device.

3. The compliant joint according to claim 1, wherein the roller spring device further comprises:
a piston connected to the roller body to support one end of the spring member,
wherein the piston is received in the mounting hole to guide a reciprocating motion of the piston therethrough.

4. The compliant joint according to claim 1, wherein the cam member comprises a preloading device capable of compressing and extending the roller spring device.

5. The compliant joint according to claim 4, wherein the preloading device comprises:
a sill supporting an end of the roller spring device; and
an adjuster screw-connected with the cam member and rotated to reciprocate the sill.

6. The compliant joint according to claim 1, further comprising a mounting member formed in the center of the cam member to mount the cam member.

7. The compliant joint according to claim 6, wherein the roller spring device further comprises:

a bushing inserted in the mounting hole; and a graphite contained in the bushing.

8. The compliant joint according to claim 1, wherein the slant surfaces are symmetrically formed with respect to the receiving recess.

* * * * *

UNITED STATES PATENT AND TRADEMARK OFFICE
CERTIFICATE OF CORRECTION

PATENT NO. : 8,021,071 B2  
APPLICATION NO. : 12/110817  
DATED : September 20, 2011  
INVENTOR(S) : Young Bo Shim et al.

It is certified that error appears in the above-identified patent and that said Letters Patent is hereby corrected as shown below:

Column 8, Line 15 (Approx.), In Claim 1, delete "includes" and insert -- includes: --, therefor.

Signed and Sealed this
Twenty-first Day of February, 2012

David J. Kappos
*Director of the United States Patent and Trademark Office*